May 5, 1925.
H. C. PRIEBE
RAILROAD CAR TRUCK
Filed Feb. 12, 1924
1,536,142
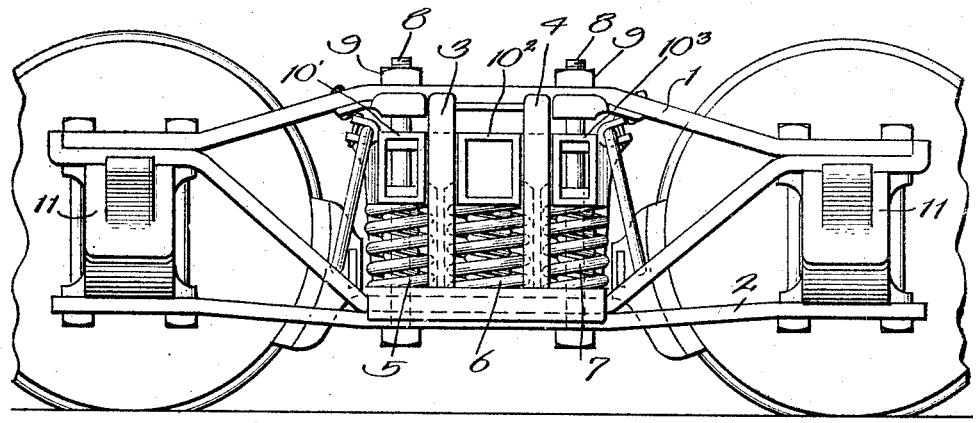
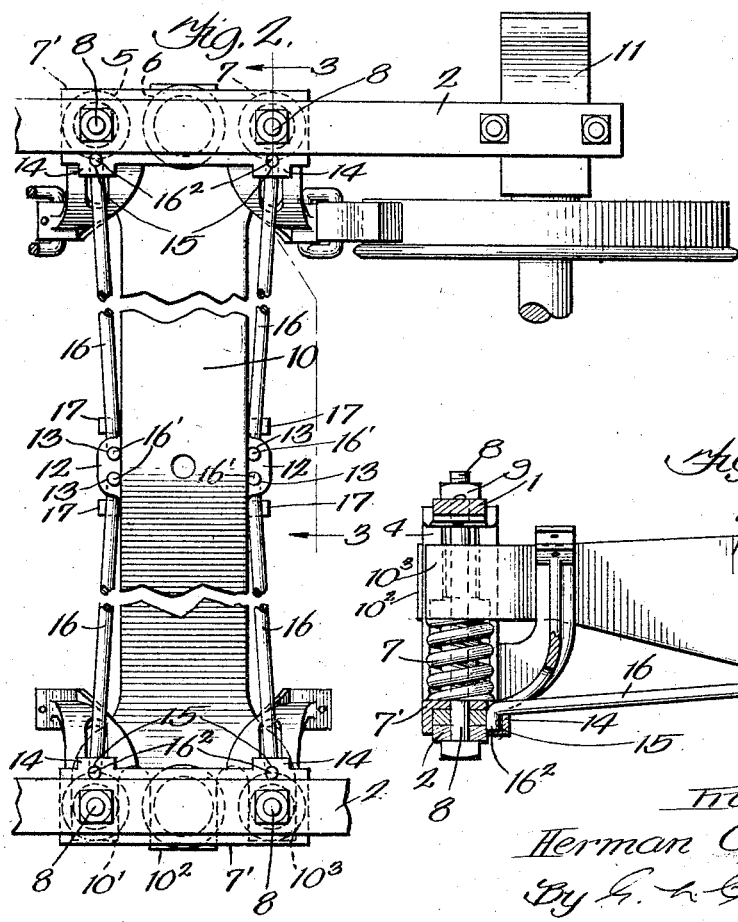
Inventor
Herman C. Priebe
By G. L. Cragg Atty.

Patented May 5, 1925.

1,536,142

UNITED STATES PATENT OFFICE.

HERMAN C. PRIEBE, OF BLUE ISLAND, ILLINOIS.

RAILROAD-CAR TRUCK.

Application filed February 12, 1924. Serial No. 692,373.

*To all whom it may concern:*

Be it known that I, HERMAN C. PRIEBE, a citizen of the United States, residing at Blue Island, in the county of Cook and the State of Illinois, have invented a certain new and useful Improvement in Railroad-Car Trucks, of which the following is a full, clear, concise, and exact description.

My invention relates to car trucks and provides a novel bracing constituting a supplemental means for assembling the bolsters of car trucks with the car truck side frames.

In carrying out my invention linkage is employed to unite intermediate portions of the truck bolsters with the side frames of the trucks.

In the preferred embodiment of the invention two links are employed in each truck, one individual to each side frame and serving to connect this frame with an intermediate and side portion of the associate bolster. The bolster supporting springs desirably serve to maintain the outer ends of the links in assembly with the side frames to which the links are individual. The truck bolster and the inner ends of the links are relatively formed to enable the links to be separable from or adapted for assembly with the truck bolster when the links are in abnormal positions with respect to the truck bolster and to prevent removal of the links when they are in their normal bracing relation with the truck bolster.

The invention will be more fully explained in connection with the accompanying drawing in which Fig. 1 is a side view of a car truck whose bolster is assembled with the side frames of the truck in accordance with the invention; Fig. 2 is a view from beneath illustrating a portion of the truck; and Fig. 3 is a sectional view on line 3—3 of Fig. 2.

Like parts are indicated by similar characters of reference throughout the different figures.

The truck side frame illustrated includes an upper arch bar 1, a lower arch bar 2, and the bolster guide bars 3 and 4. Each side of the truck has such a side frame. As the drawing only illustrates the complete construction at one side of the truck, the construction of but one side will be alone described, it being understood that such description pertains to the construction at each side.

Upright truck bolster supporting springs 5, 6 and 7 are located between the arch bars and in the general plane thereof. These springs are seated upon the seat 7' carried upon the lower arch bar. The upright bolts 8 which serve to define the positions of the springs 5 and 7 pass through the arch bars with which the bolts are held in assembly by means of nuts 9 threaded upon the upper ends of the bolts. The truck bolster 10 is formed into three fork branches 10', 10³, 10³ at each end. The bolts 8 pass upwardly through the outer springs 5 and 7 and the truck bolster branches 10', 10³. The middle truck bolster branch 10² is disposed between the guide bars 3 and 4 while the truck bolster branches 10', 10³ are upon the outer sides of these guide bars, this structure forming the subject matter of another application, Serial No. 692,369, filed Feb. 12, 1924.

In the structure shown, the arch bars are brought together at the ends of the frame above the journal boxes 11.

Ears 12 are cast upon each side of the bolster at the middle thereof and near its bottom. Each of these ears is formed with upright openings or sockets 13 therethrough spaced apart along the bolster. The lower arch bar 2 of each side frame is formed with two lugs 14 upon its inner side and spaced apart longitudinally thereof, these lugs being preferably abreast of the springs 5 and 7. Each lug is formed with an upright opening or socket 15 which underlies the spring above it.

The mid portion of the bolster is assembled with each side frame by means of two links 16, one upon each side of the bolster. Each socket 13 and each socket 14 upon the same side of the bolster receives such a link which is formed with a down turned inner end 16' received in a socket 13 and a down turned outer end 16² that is received in a socket 15, such links and the sockets receiving the same being upon the same side of the bolster and the two sockets being upon the same side of the bolster. Lugs 17 are formed upon each side of the bolster, there being such a lug above each socket 13 and located sufficiently far away and to one side thereof as to engage the top of the corresponding lug 16 and hold the inner end 16' thereof within the corresponding socket 13. In assembling the links, they are approached to the bolster at an angle thereto to escape the lugs 17 in order that their inner ends 16' may be dropped into the sockets 13. The links are then turned to lie along the bolster between the lugs 17 and 12. In this position the outer ends of the links may be dropped into the sockets 15 whereafter the bolster supporting springs are assembled with the side frames. When thus assembled, the springs 5 and 7 overlie the sockets 15, being sufficiently close thereto to hold the outer ends of the links in these sockets.

It is obvious that changes may be made without departing from the spirit of my invention.

Having thus described my invention I claim as new and desire to secure by Letters Patent the following:—

1. A car truck including the side frames thereof; a truck bolster extending between the side frames; bolster supporting springs carried by the side frames; and linkage connecting the side frames with intermediate and side portions of the bolster and held in assembly with the side frames by said springs.

2. A car truck including the side frames thereof; a truck bolster extending between the side frames; bolster supporting springs carried by the side frames; and linkage connecting the side frames with intermediate and side portions of the bolster, the side frames having upright sockets and the linkage having down turned outer ends received in said sockets.

3. A car truck including the side frames thereof; a truck bolster extending between the side frames; bolster supporting springs carried by the side frames; and linkage connecting the side frames with intermediate and side portions of the bolster.

4. A car truck including the side frames thereof; a truck bolster extending between the side frames; bolster supporting springs carried by the side frames; and two links, one individual to each side frame, each link connecting the side frame to which it is individual with an intermediate and side portion of the bolster and having its outer end held in assembly with such side frame by the spring element carried by this side frame.

5. A car truck including the side frames thereof; a truck bolster extending between the side frames; bolster supporting springs carried by the side frames; and two links, one individual to each side frame, each link connecting the side frame to which it is individual with an intermediate and side portion of the bolster, the side frames having upright sockets and the links having down turned outer ends received in said sockets, said sockets closely underlying said springs that hold the links and side frames in assembly.

6. A car truck including the side frames thereof; a truck bolster extending between the side frames; bolster supporting springs carried by the side frames; and two links, one individual to each side frame, each link connecting the side frame to which it is individual with an intermediate and side portion of the bolster.

7. A car truck including the side frames thereof; a truck bolster extending between the side frames; bolster supporting springs carried by the side frames; and two links, one individual to each side frame, each link connecting the side frame to which it is individual with an intermediate and side portion of the bolster, the bolster having upright sockets and the links having down turned inner ends received in said sockets, said springs holding the links and side frames in assembly.

8. A car truck including the side frames thereof; a truck bolster extending between the side frames; bolster supporting springs carried by the side frames; two links, one individual to each side frame, each link connecting the side frame to which it is individual with an intermediate and side portion of the bolster and having its outer end held in assembly with such side frame by the spring element carried by this side frame, the bolster having upright sockets at a mid portion of the side thereof and the links having down turned inner ends received in said sockets; and lugs upon the bolster located above said sockets sufficiently far away to permit passage of the inner ends of the links between the sockets and lugs when the links are being assembled with the bolster and sufficiently close to the sockets to hold the inner ends of the links in place when the outer ends of the links are assembled with the side frames.

9. A car truck including the side frames thereof; a truck bolster extending between the side frames; bolster supporting springs carried by the side frames; two links, one individual to each side frame, each link connecting the side frame to which it is individual with an intermediate and side portion of the bolster, the side frames having upright sockets and the links having down turned outer ends received in said sockets, said sockets closely underlying said springs that hold the links and side frames in assembly, the bolster having upright sockets at a mid portion of the side thereof and the links having down turned inner ends received in the latter sockets; and lugs upon the bolster located above the latter sockets sufficiently far away to permit passage of the inner ends of the links between these sockets and lugs when the links are being assembled with the bolster and sufficiently close to these sockets to hold the inner ends of the links in place when the outer ends of the links are assembled with the side frames.

10. A car truck including the side frames thereof; a truck bolster extending between the side frames; bolster supporting springs carried by the side frames; two links, one individual to each side frame, each link connecting the side frame to which it is individual with an intermediate and side portion of the bolster, the bolster having upright sockets at a mid portion of the side thereof and the links having down turned inner ends received in said sockets; and lugs upon the bolster located above said sockets sufficiently far away to permit passage of the inner ends of the links between the sockets and lugs when the links are being assembled with the bolster and sufficiently close to the sockets to hold the inner ends of the links in place when the outer ends of the links are assembled with the side frames.

In witness whereof, I hereunto subscribe my name.

HERMAN C. PRIEBE.